United States Patent [19]

Jensen

[11] Patent Number: 5,062,876
[45] Date of Patent: Nov. 5, 1991

[54] METHOD AND APPARATUS FOR FORMING ROUND GLASS FIBERS

[75] Inventor: Thomas H. Jensen, Murrysville, Pa.
[73] Assignee: PPG Industries, Inc., Pittsburgh, Pa.
[21] Appl. No.: 551,986
[22] Filed: Jul. 12, 1990

Related U.S. Application Data

[63] Continuation-in-part of Ser. No. 357,157, May 26, 1989, abandoned.

[51] Int. Cl.$^5$ .............................................. C03B 37/08
[52] U.S. Cl. .............................................. 65/1; 65/2; 65/12
[58] Field of Search ..................................... 65/1, 2, 12

[56] References Cited

U.S. PATENT DOCUMENTS

| | | |
|---|---|---|
| 2,489,508 | 11/1949 | Stalego . |
| 2,908,036 | 10/1959 | Russell .................................... 65/12 |
| 3,475,147 | 10/1969 | Stalego . |
| 3,514,841 | 6/1970 | Woodward et al. . |
| 3,598,952 | 8/1971 | Roberson . |
| 3,607,185 | 9/1971 | Andrysiak . |
| 3,685,978 | 8/1972 | Hansen et al. . |
| 3,979,195 | 9/1976 | Strickland . |
| 4,343,635 | 8/1982 | Kim et al. . |
| 4,622,054 | 11/1986 | Huey et al. . |
| 4,636,234 | 1/1987 | Huey et al. . |
| 4,666,485 | 5/1987 | Huey . |
| 4,759,784 | 7/1988 | Shono et al. ............................. 65/2 |

FOREIGN PATENT DOCUMENTS 947183  1/1964  United Kingdom .

OTHER PUBLICATIONS

The Manufacturing Technology of Continuous Glass Fibers, by K. L. Lowenstein, published by the Elsevier Scientific Publishing Company, New York, 1973, pp. 61-66 and 89-106.

Primary Examiner—Robert L. Lindsay
Attorney, Agent, or Firm—Andrew C. Siminerio; Richard E. Maebius

[57] ABSTRACT

This invention relates to a novel bushing apparatus having unique nozzles or projecting orifices for the production of round glass fibers. Particularly, it relates to a bushing having tips with cross-sections in the form of finite-sided polygons. It is shown that the use of noncircular tips to produce round fibers can result in higher tip packing densities, higher throughputs, and increased forming process stability than are now possible using the present state of the art. Tips with square cross-sections are shown to be the most preferred embodiment.

12 Claims, 5 Drawing Sheets

METHOD AND APPARATUS FOR FORMING ROUND GLASS FIBERS

This is a continuation-in-part application of U.S. Ser. No. 07/357,157, filed May 26, 1989 now abandoned.

BACKGROUND OF THE INVENTION

1. Field of the Invention

The present invention relates to a bushing for the production of round glass fibers.

2a. Technical Considerations

In the forming of glass fibers utilizing modern technology, electrically-heated containers known as bushings, typically constructed of precious metals such as platinum or palladium and alloys thereof, are used. Molten glass is fed into the bushing and flows out through a multiplicity of nozzles or projecting orifices (hereinafter referred to as "tips") carried on what is commonly referred to as a tip plate which typically forms the bottom of the bushing. The flow of glass through the tips is usually driven by the hydrostatic pressure exerted by the molten glass above the tip plate. In some cases, it may be desirable to prepressurize this hydrostatic head by applying a pressurized gas such as air above the glass. As glass exits the tips, natural convection and enhanced radiative heat transfer due to the presence of fin coolers, removes heat from the glass.

A difficulty encountered in the use of platinum alloys for the construction of tip plates is that the wetting angle of the glass on the particular alloy used may be such that molten glass tends to adhere or wet the exterior surface of the tip. Wetting may take place to the extent that the glass from one stream spreads and merges with an adjacent one. This renders further attenuation impossible and the glass must be cleaned from the tip plate so that the process can be restarted. In commercial production, these interruptions are referred to as "breakouts" and their frequency of occurrence must be kept to a minimum in order to maintain a high job efficiency. In recent years, the size of production bushings has increased to the point where tip plates carrying as many as 1,200, 1,800 and even 4,000 or more tips are commonplace, and wetting and subsequent breakout has become more acute.

Since a considerble investment in costly precious metals is required to construct a bushing, it would be advantageous to fabricate as many tips per square inch that can be feasibly accommodated on the tip plate to reduce the quantity of precious metals used. The number of tips or orifices per square inch will hereinafter be referred to as the "packing density" of the tip plate.

The prior art teaches one method for lowering the quantity of precious metals used in bushing construction by eliminating the tips entirely and replacing them with a flat perforated plate having a large number of holes or orifices to accommodate the flow of glass. Unfortunately, as the packing density of the orifices increases, there is a greater tendency to wet the bottom of the plate, as discussed earlier. In an effort to reduce wetting, intersecting grooves may be cut between the orifices at right angles to one another. This restricts the movement of glass across the undersurface of the plate in an attempt to prevent the merger of glass issuing from one orifice with that of another.

Flat perforated plates have also been used to form noncircular fibers. Molten glass is discharged from flat plates having noncircular orifices, and in some instances under high pressure, and the issued fibers are immediately cooled to "freeze" the noncircular shape of the fiber.

In bushings that employ tips as orifices, one is physically limited by the wall thickness of the tips to a theoretical maximum packing density which is often greater than that which can be realized in actual glass fiber production. This is because a limiting threshold is reached as the pitch or spacing between the tips is made smaller and smaller at which point a breakout at one tip may allow molten glass to spread or flood across the surface of the tip plate and interrupt the fiber forming process. Conically shaped or tapered tips have been developed to overcome this difficulty since the area wetted by the glass flowing from each tip is theoretically limited to the bottom surface thereof. But, even when these tips are spaced too closely to one another, glass may flow into the recesses between them by capillary action and again cause a disruption of the forming process.

Nevertheless, it has always been the usual practice of the industry to fabricate individual tips in the form of round conical cylinders having circular cross-sections. Examples are disclosed in the book entitled *The Manufacturing Technology of Continuous Glass Fibers* by K. L. Lowenstein, published by the Elsevier Scientific Publishing Company, New York, 1973 at pages 94–95. It has also been observed in both the patent and scientific literature that the production of round fibers is usually illustrated as originating from tips having a round cross-section.

It would be advantageous to be able to produce round fibers with bushings having a higher packing density while at the same time be able to maintain the processing stability required to prevent flooding of the bushing and subsequent breakout.

2b. Patents of Interest

U.S. Pat. Nos. 2,489,508 to Stalego and 3,607,185 to Andrysiak disclose forming glass fibers using a bushing having tips that share a common sidewalls. The outlet end of the tips formed by their common walls may be noncircular and is much larger than the inlet end of the tip.

U.S. Pat. No. 3,475,147 to Stalego discloses a method and apparatus for dividing a source of heat softened mineral material into a plurality of smaller streams. The tips generally have a circular inlet end and a noncircular outlet end.

U.S. Pat. No. 4,343,635 to Kim et al. discloses a glass fiber forming apparatus wherein the orifice plate of the bushing has a plurality of orifices separated by grooves in lower surface of the plate to reduce wetting of the plate by the molten glass.

U.S. Pat. Nos. 3,979,195 to Strickland; 4,622,054 and 4,636,234 to Huey et al.; 4,666,485 to Huey and 4,759,784 to Shono et al. all disclose the use of flat forming plates with noncircular openings to form noncircular glass fibers. In each, molten glass exits through the openings in the plate, and in some instances under high pressure, and is immediately cooled to maintain its noncircular configuration. Although these references recognize that the surface tensions in molten glass may tend to change the configuration of the glass stream upon exiting the forming plate, they do not recognize or appreciate the problem associated with increasing the temperature of the glass in order to lower the glass viscosity, namely flooding of the forming plate and subsequent breakout. Increasing the glass temperature as inferred in the references would result in the glass flooding the plate, thus disrupting the entire glass fiber forming operation. Furthermore, while the effects of surface tension forces are known in the art, these patents disclose methods to avoid these effects. Surface tension forces have never been used to produce round fibers from a noncircular tip. As it will be shown, several advantages can be gained by doing so.

SUMMARY OF THE INVENTION

The present invention provides for the production of round fibers or filaments from a plurality of discrete, spaced apart fiber glass bushing tips having noncircular cross-sections. In particular, the round fibers are produced using tips having cross-sections which are in the form of substantially regular finite-sided polygons, e.g. triangles, squares, pentagons, hexagons, heptagons, and octagons. Also contemplated are tips having irregular polygonal cross-sections such as right triangles and rhomboids. As molten glass emerges from tips having one of these shapes, the glass is of a sufficiently low viscosity that its surface tension will tend to pull each stream of molten glass into a substantially circular cross-section. The glass fiber is subsequently cooled. Nonuniformities in the roundness of the fiber will thus tend to be corrected by the surface tension forces prior to the cooling and solidification of the molten glass. In one particular embodiment of the invention, the tips have a square cross-section and are oriented such that the diagonals of the tips lie parallel to the major and minor axes of the bushing with the tips in adjacent rows staggered with respect to one another in order to maximize the packing density of the tips.

The present invention also discloses the use of noncircular tips to achieve higher tip packing densities, higher throughputs, and increased forming process stability than is now possible using the present state of the art.

DETAILED DESCRIPTION OF THE INVENTION

Figure 1:
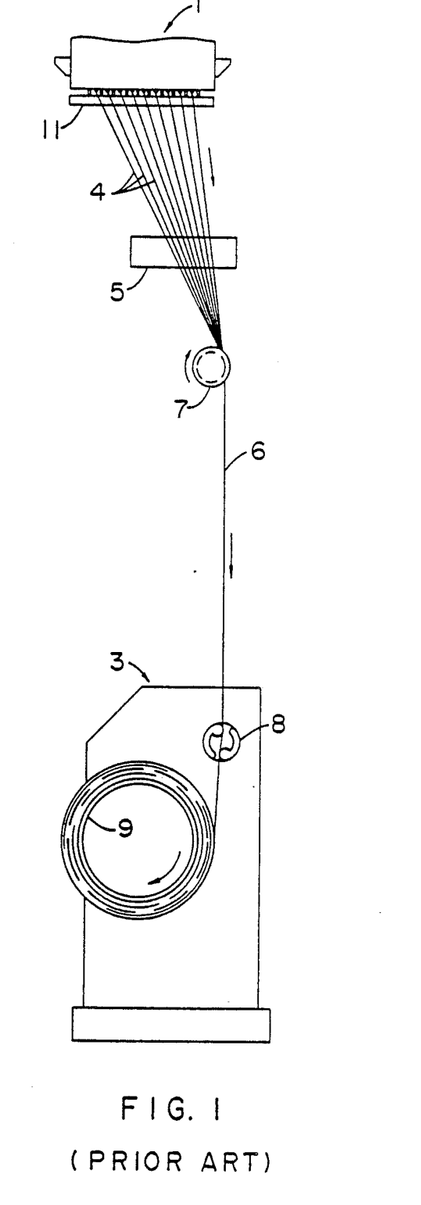
FIG. 1 is a general schematic of a conventional fiber glass forming process showing a bushing, an applicator and a winder.
Figure 2:
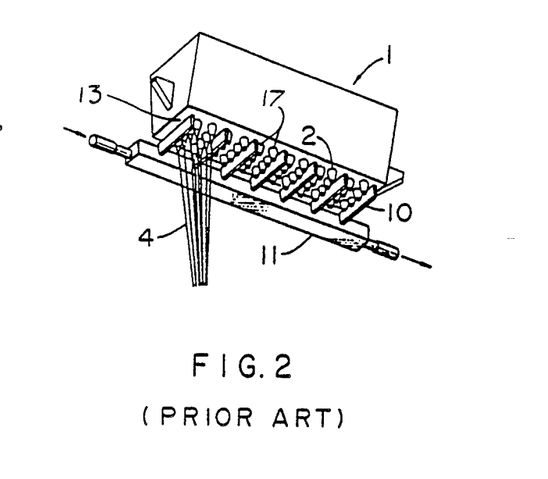
FIG. 2 is a perspective view of a bushing, its associated fin coolers, individual tips and fibers emerging therefrom.

With reference to the drawings, FIGS. 1 and 2 illustrate a conventional continuous direct draw process for the production of glass fibers wherein molten glass is fed into the top of a bushing assembly (1) and exits from a plurality of tips (2) to form individual glass cones which are then cooled and attenuated by means of a winder (3) into individual glass fibers (4). The individual fibers (4) are brought in contact with an applicator (5) and coated with a chemical size or binder. The fibers (4) are then gathered into a single strand (6) by a gathering shoe (7), normally in the form of a wheel having a grooved rim. The strand (6) is then wound over a rotating spiral (8) and onto a cardboard forming tube (9) which is rotated by an appropriately powered winder (3). The winder may cause either the forming tube (9), spiral (8) or both to reciprocate back and forth along their axis of rotation so that the strand (6) passing over the spiral (8) is laid down along the length of the forming tube (9). Cooling fins (10) are inserted between adjacent rows of tips (2) with one end of each fin being attached to a manifold (11) through which a cooling fluid, such as water, is pumped. The fins (10) are positioned so as to absorb radiative heat from the individual glass cones and conduct it to the manifold (11) where it is removed by the cooling fluid. The fins also remove some heat radiated by the tip plate (13).

Figure 3:
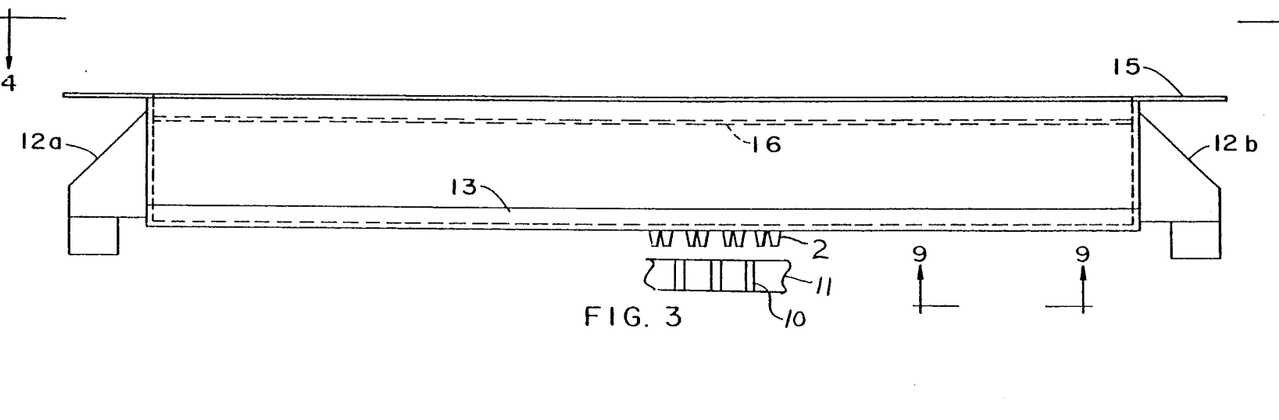
FIG. 3 is a front elevational view of a typical production bushing, with portions removed for clarity.
Figure 4:
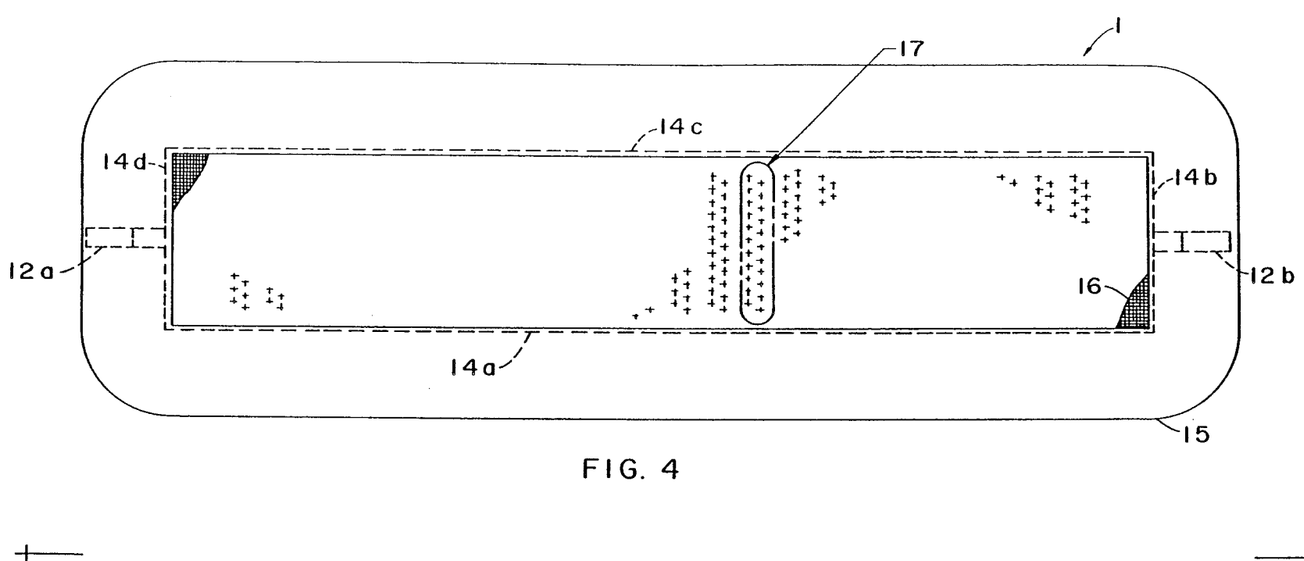
FIG. 4 is a top plan view of the bushing of FIG. 3 taken along line 4—4.

FIGS. 3 and 4 present an elevational and top plan view respectively of a typical bushing (1). The top of the bushing (1) is brought in contact with a glass supply source. The supply source may be the forehearth of a direct melt furnace in which glass flows directly along the length of the forehearth and into the bushing. Lowenstein, supra, at pages 61-66, describes a typical fiber glass direct melt forehearth system and shows several configurations of forehearths with bushings attached thereto. Specifically at page 66, the author shows the attachment of a bushing to a typical forehearth. In the same book at pages 89-100, typical fiber glass bushings and their relation to the fiber drawing process are described. An alternative supply system, which may also be used, is one in which glass is supplied in the form of solid marbles to a special bushing. The marbles are then melted directly inside the bushing and the resulting glass fed through a plurality of tips located on its bottom. A bushing of this type is shown in Lowenstein, supra, at pages 102-104.

Two ears or terminals (12a and 12b) are provided for passing an electrical current through the bushing assembly (1) in order to heat it and the tip plate (13). The bushing has four sidewalls (14a, b, c and d) suspended from a flange (15) and attached to the tip plate (13) at their other extremity typically by welding. The bushing (1) has an open top so that the sidewalls and tip plate form a cavity to accommodate molten glass flowing from the forehearth or upper part of a marble melt bushing as described above. A screen (16) may also be provided in order to prevent any small particulate debris carried in the glass from reaching the tip plate (13) although bushings without screens may also be used.

The tip plate (13) carries a plurality of tips (2), as shown in FIGS. 1 through 4, arranged in groups (17) of at least two rows parallel to each other and the minor axis of the tip plate. These groups (17) are usually separated by a space wide enough to accommodate the insertion of an individual fin (10) carried by the manifold (11) which are collectively referred to as fin coolers by those skilled in the art. Although not limiting in the present invention, in a preferred embodiment of the invention, the tips (2) in each row are linked by an integrally formed rib (not shown) to increase the bending stiffness of the tip plate (13) and its resistance to high temperature thermal creep as disclosed in U.S. Ser. No.

07/357,160, filed May 26, 1989, which teachings are incorporated by reference.

With reference to FIG. 5, some of the individual tips (2) contemplated by the instant invention for the production of circular glass fibers are shown in perspective. For example, an equilateral triangle, a square, a pentagon, a hexagon, and an octagon as shown in FIGS. 5a through 5e, respectively, are all forms of regular polygons having sides of equal length. It is a property of regular polygons that they may be circumscribed by a circle that touches each vertex of the polygon. Although regular polygons are preferred, this does not mean that this invention neglects to contemplate the use of irregular polygonal shapes as well. For example, a tip having a cross-section in the shape of a right triangle is envisioned as shown in FIG. 5f. A tip having four sides of equal or unequal length and formed in the shape of a parallelogram or rhombus, as well as a square tip, is similarly contemplated. In addition, the sides of the polygon may be curvilinear as shown in FIG. 5g.

Figure 5A:
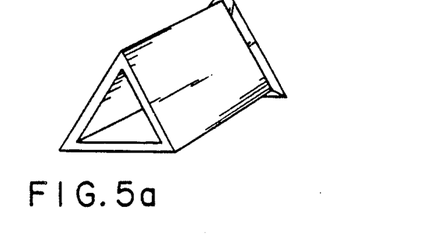
FIGS. 5a through 5g are perspective views of various noncircular tips which can be used to produce round fibers.
Figure 5B:
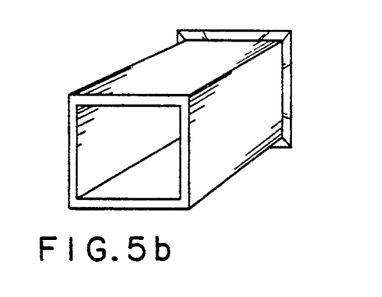
Figure 5C:
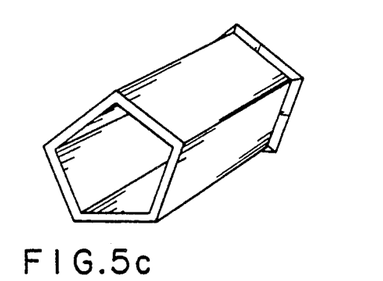
Figure 5D:
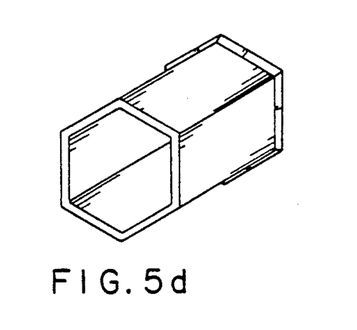
Figure 5E:
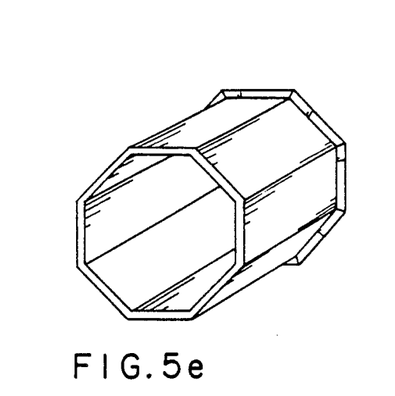
Figure 5F:
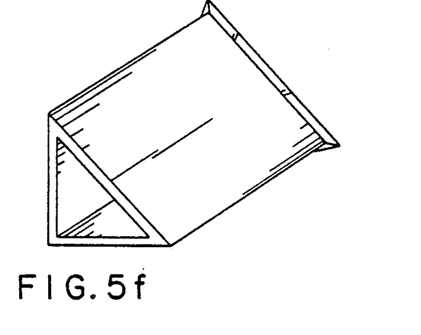
Figure 5G:
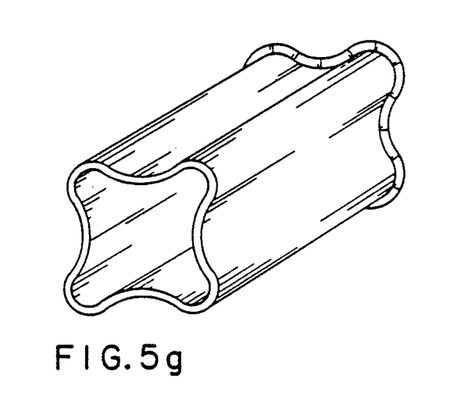
Figure 6:
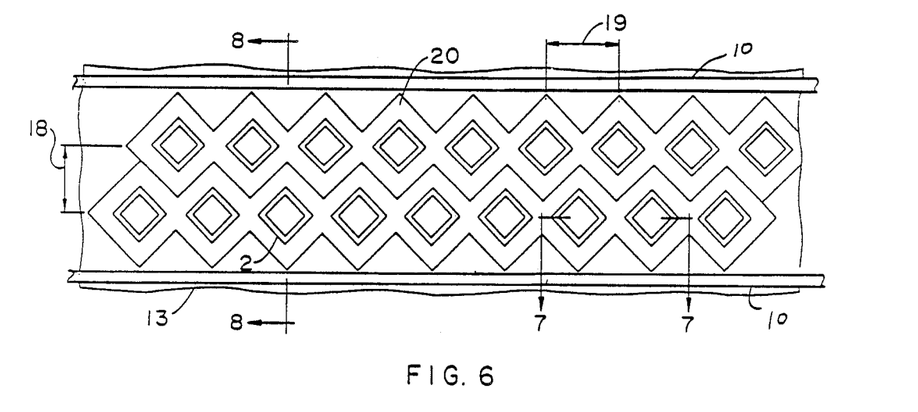
FIG. 6 is a bottom plan view of a tip plate having square tips arranged in their most preferred orientation.

In the practice of the instant invention, the square tip of FIG. 5b is the most preferred embodiment and in FIG. 6, these tips are shown in their most preferred orientation. The tips are preferably positioned in such a fashion that their diagonals lie parallel to the major and minor axis of the tip plate (13) and tips in adjacent rows are staggered with respect to one another. This arrangement minimizes the pitch (18) between adjacent rows as well as the pitch (19) between adjacent tips in the same row as shown in FIGS. 6, 7 and 8.

Figure 7:
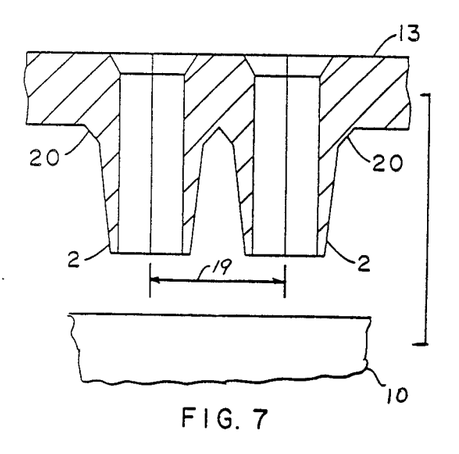
FIG. 7 is a cross-sectional view of adjacent tips taken along line 7—7 of FIG. 6.
Figure 8:
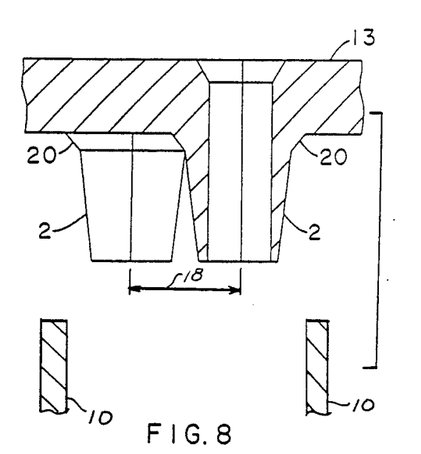
FIG. 8 is a cross-sectional view of adjacent tips taken along line 8—8 of FIG. 6.
Figure 9:
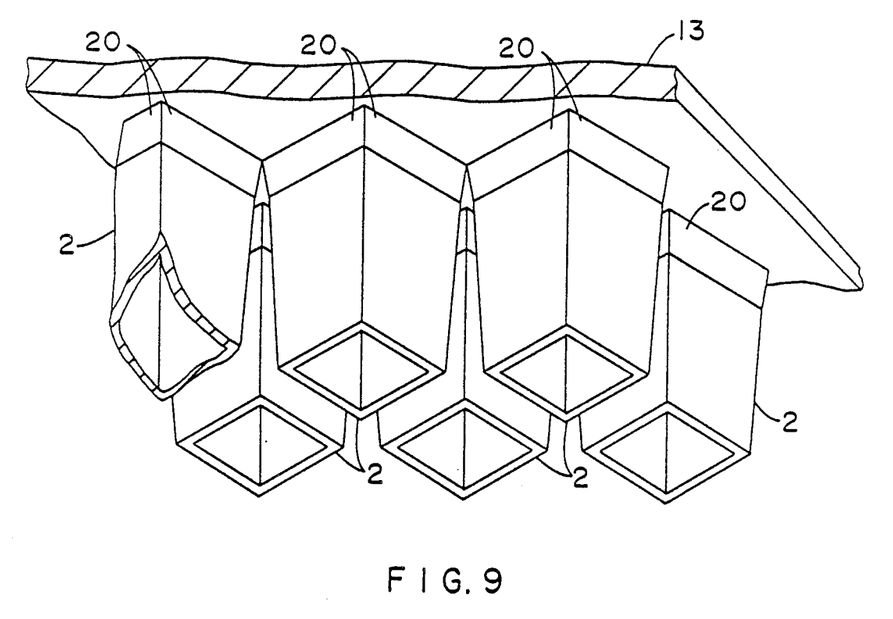
FIG. 9 is an enlarged perspective view of a section of the tip plate of FIG. 3 taken along line 9—9, with portions removed for clarity.

FIG. 7 presents a cross-sectional view of two tips adjacent to one another in the same row as taken along line 7—7 of FIG. 6. The tips (2) are integrally formed with the tip plate (13) by the cold draw or coining process as described in Lowenstein, supra, at pages 95-97 although the other techniques described therein may be used as well. A shoulder (20) near the base of each tip (2) is also usually formed as a result of the cold drawing process. FIG. 8 presents a cross-sectional view of the tips taken along line 8—8 in FIG. 6. Fins 10 are positioned to remove heat from the glass. FIG. 9 better illustrates the relationship of the tips (2) by providing a perspective view of them as they would be seen looking from below the tip plate and generally into line 9—9 of FIG. 3.

Bushings, as previously described, are constructed from precious metals such as platinum, rhodium, palladium and alloys thereof. A typical alloy that has been widely used contains approximately 80 percent platinum and 20 percent rhodium on a weight basis. Sometimes, grain stabilized platinum and grain stabilized platinum alloys have been employed where strength and creep resistance are primary design criteria. Other alloys have included platinum and platinum-rhodium alloys containing small amounts of iridium or ruthenium to also increase strength. Gold has also been occasionally used to locally alter the wetting characteristics of the glass.

In the operation of a bushing, as molten glass issues from each tip into the atmosphere, the stream will neck down to form a cone-like body of glass from which the fiber is eventually drawn. The degree of necking is determined by the viscosity of the glass which is highly temperature dependent. The tensile forces present in the cone due to the attenuation process are strongly related to the viscosity. Surface tension also contributes to the transfer of forces over the periphery of the cone.

In the present invention, the glass temperature at the exit end of the tip (2) is in the range of 2150° F. to 2400° F. (1177° C. to 1315° C.) and has a viscosity in the range of about 500 poise or less. When the glass emerges from the noncircular tip (2) it has a low viscosity and its surface tension constricts the surface of the glass causing it to assume a circular cross-section even though the glass initially issues from tips (2) with substantially the same cross-section as the tip. Depending on the glass temperature and viscosity, these surface tension forces may be so strong as to actually cause glass issued at a very high temperature to coalesce into beads or droplets rather than flow in a continuous stream. At lower temperatures and higher viscosities, the behavior of the stream is largely dominated by the increased viscosity which negates the surface tension effects. This is the reason why, when the production of a noncircular fiber is desired, it is necessary to rapidly quench glass issuing from a noncircular opening and increase its viscosity in order to "freeze" its shape as it exits the opening before the surface tension has time to change the glass cross-section. As a result, in the present invention, the glass temperature is maintained at a temperature sufficient to provide a viscosity that allows the surface tension forces to change the glass stream cross-section from a noncircular to a round configuration.

It is also believed that the use of noncircular tips to produce circular fibers in combination with the cooling fins (10) helps to benefit the stability of the forming process and reduce the frequency of breakouts as well as any tendency of the tip plate to flood. Specifically, in the immediate vicinity of the tip, the irregular surface of the glass stream as it exits into the surrounding atmosphere, which initially corresponds to the noncircular cross-section of the exit end of the tip (2), provides an increased localized surface area for enhanced convective and radiative heat transfer that would not be present on a circular tip cross-section. This enhanced cooling increases the rate of heat transfer from the glass to a value higher than it would be if the glass had an initial circular cross-section. Because the enhanced cooling results in heat being extracted from the glass at a faster rate as compared to a glass stream with a round cross-section, the throughput of the bushing can be increased while maintaining forming stability equivalent to that of a circular tip at lower throughput. As an alternative, the enhanced cooling could also allow the forming operation to run at a higher forming temperature and equivalent throughput resulting in reduced forming tension. In addition to the overall enhanced cooling of the glass cross-section, the corners of the glass stream experience additional localized cooling which further increases the heat transfer rate in these portions of the glass to a value higher than the rest of the glass resulting in a localized higher viscosity as compared to the remaining portions of the glass. It is believed that these effects of the enhanced cooling help stabilize the cone and formation of the fiber while the glass stream is coalesced by the surface tension forces to form a round cross-section.

An overall increase in glass fiber cooling also occurs because of the increased surface-to-volume ratio of the glass cone immediately adjacent to the tip. Assuming that the glass emerges with substantially the same cross-section as the tip, it is a simple matter to calculate both the perimeter and cross-sectional area near the tip exit by the use of readily available formulas. It can be shown that the ratio of the perimeter and cross-sectional area is equivalent to the surface-to-volume ratio of a section of the glass cone. A large surface-to-volume ratio implies that more surface area of the stream is exposed and available for cooling than in a stream exiting from a tip with a lower surface-to-volume ratio. Glass exiting a round tip has the smallest surface-to-volume ratio and is, therefore, the most inefficiently cooled. This will become apparent from the remainder of the disclosure.

From the preceding discussion, it is apparent that there is a direct relationship between the cooling of the glass stream and its ability to change from a noncircular to a round fiber cross-section while operating under stable forming conditions. Cooling is affected by the fiber shape, the glass throughput, and the cooling capacity and positioning of the cooling fins. It has already been discussed how the noncircular shape provides for enhanced cooling of the fiber as compared to a round cross-section so as to allow the throughput of the bushing to increase and/or operation at higher forming temperatures. It should be appreciated that changes to the fins may also be used to control the forming of the fiber and the bushing throughput. In particular, throughput can be further increased and/or higher forming temperatures may be used if the cooling capacity of the fins is increased and/or the fins are moved closer to the exit end of the tips so as to extract heat at a faster rate. As a result it should be appreciated that it is the interaction between the fiber shape, the forming temperature, the throughput and the fin coolers that allow the noncircular fiber shape to change to a round shape while maintaining a stable forming operation.

The use of a noncircular tip in the form of substantially regular finite-sided polygons or irregular variations thereof also results in the instant invention's success in increasing the packing density of the tips and thus better utilizing the available surface area of the tip plate. The best arrangement for bringing tips, or any other round object in closest contact with one another in order to minimize the interstitial area between them is to pack them in a staggered fashion so that a line connecting their centers forms an equilateral triangle. This triangle will fully enclose an area equal to one-half of the circular cross-section of the tip plus an unoccupied interstitial area. Given a tip of outside diameter D and assuming that the effect of the shoulder (20) and finite wall thickness can be neglected, the interstitial area is equal to the difference between the cross-sectional area of the aforementioned equilateral triangle ($3^{\frac{1}{2}}D^2/4$) and one-half the cross-sectional area of the tip. When expressed as a percentage of the total cross-sectional area contained within the triangle, this unoccupied area amounts to 52 percent of the total. If the tips were in the form of a regular polygon, the wasted area would be significantly reduced and in particular, if the tips were square, this wasted area would be eliminated entirely because the tips could be theoretically arranged to be in perfect contact with one another.

The use of noncircular tips described in the instant invention also increases the tip packing density because of the manner in which they are sized in relation to a circular tip. The sizing is accomplished by determining the characteristic dimension of the noncircular tip so as to yield the same internal cross-sectional area as would be provided by a circular tip having an inside diameter D. For example, in the case of a square having four sides of equal length L, the same flow area of $\pi D^2/4$ that would be provided by a circular tip would also be present in the square one if L were equal to $\pi^{\frac{1}{2}}D/2$ or approximately 0.886 D. It is a simple matter to size the dimensions of other tips having cross-sections in the form of regular polygons through the use of the formula:

$$L=(\pi \tan(180/N)/N)^{\frac{1}{2}}D$$

where D is the inside diameter of a round tip, N is the number of sides of a regular polygon having an equivalent cross-sectional area, and L is the length of each side.

Table I presents the ratio L/D obtained using the above equation, the perimeter ratio of the polygon to that of a circle (this reflects the increased surface area available for heat transfer), and the surface-to-volume ratio discussed previously multiplied by the diameter of a reference circle D in order to nondimensionalize the result.

TABLE I

| Number of Sides | Shape | L/D | Perimeter Ratio | Surface-to-Volume Ratio |
|---|---|---|---|---|
| 3 | Triangle | 1.347 | 1.286 | 5.144 |
| 4 | Square | .886 | 1.128 | 4.512 |
| 5 | Pentagon | .676 | 1.075 | 4.300 |
| 6 | Hexagon | .550 | 1.050 | 4.200 |
| 7 | Heptagon | .465 | 1.036 | 4.144 |
| 8 | Octagon | .403 | 1.027 | 4.108 |
| $\infty$ | Circle | — | 1.000 | 4.000 |

It is apparent from Table I that as the number of sides of the polygon increases, its perimeter approaches that of the circle. In addition, it would appear that a tip sized in the shape of an equilateral triangle would be superior to a round one since a tip sized in the shape of an equilateral triangle has 28.6 percent more exposed surface area available for heat transfer than a round one. However, this is not the preferred embodiment of the instant invention because the maximum packing density can only be realized with a tip having a square cross-section, as discussed below. This becomes more apparent upon realizing that a tip in the form of a right 45° triangle is nothing more than a square divided in two or that a hexagon is nothing more than a collection of six equilateral triangles.

The improvement in tip packing densities that can be achieved using a square tip becomes more apparent by comparing the merits of round vs. square tips by way of an example. Assume each tip has a length of 0.120 inches (0.305 cm) as measured from the tip plate to the tip exit. Furthermore, assume that each tip has a uniform wall thickness on the order of 0.010 inches (0.025 cm). In practice, the wall thickness will usually be tapered from top to bottom in order to reduce the wettable surface at the end of the tip thereby preventing the glass from flooding as was previously discussed. A round tip having an inside diameter of 0.075 inches (0.191 cm) has a cross-sectional area on the order of $4.42 \times 10^{-3}$ in$^2$ ($28.52 \times 10^{-3}$ cm$^2$) to accommodate the flow of glass and an inner perimeter of about 0.24 inches (0.61 cm). The ratio of the perimeter to the cross-sectional area, or surface-to-volume ratio, is on the order of 57 in$^{-1}$. This same cross-sectional area can be provided by a square tip having an inside dimension equal to $0.886 \times 0.075$ or roughly 0.0665 inches (0.1689 cm). The perimeter will equal four times this dimension or 0.266 inches (0.676 cm). The surface-to-volume ratio in this case is roughly 63 in$^{-1}$.

Assuming a wall thickness of 0.010 inches (0.025 cm), the round tip can be inscribed within a square having a side dimension of 0.095 inches (0.241 cm) and thus occupies an area of about $9 \times 10^{-3}$ in$^2$ ($58.06 \times 10^{-3}$ cm$^2$). The reciprocal of this number is the packing density which in this case is approximately 110 tips per square inch. The square tip which provides the same cross-sectional area occupies a square having a side dimension of only 0.0865 inches (0.2197 cm) and cross-sectional area of $7.48 \times 10^{-3}$ in$^2$ ($48.26 \times 10^{-3}$ cm$^2$). This yields a packing density of roughly 133 tips per square inch. These calculations show that the same volumetric flow rate can be achieved using roughly 16.8 percent less total surface area per tip than could be had by employing tips of a conventional circular geometry.

While this invention has been described with reference to certain embodiments in the specification it is not intended that it be limited thereto except as recited by the accompanying claims. All of the preceding examples have been included for illustrative purposes only and are not intended to limit the scope of the invention.

I claim:

1. An apparatus for producing continuous round glass fibers by drawing molten glass streams from tips of a bushing comprising:

a lower bushing tip plate for discharging streams of molten glass having a viscosity of approximately 500 poise or less, said plate being positioned in a container for holding said molten glass;

a plurality of discrete, spaced apart, hollow tips extending downwardly from said lower plate, said tips including;

wall members defining the shape of said tip wherein said wall members of each of said tips are spaced from wall members of adjacent tips and said tips are arranged in groups of rows to accommodate the flow of molten glass therethrough while minimizing the potential for flooding between said tips; and a lower end spaced from said lower plate wherein the cross-section of said lower end of said tips is substantially a regular polygon in shape; and means to allow said glass fibers to retain said viscosity for sufficient period of time such that surface tension forces in said glass fibers can act on said fibers to change their cross-section from an initial shape corresponding to the said regular polygon shaped cross-section of said lower end of said tips to a round shape.

2. The bushing as in claim 1 wherein said allowing means includes at least one fin cooler assembly positioned beneath said bushing and having a plurality of cooling fins attached thereto, each of said fins being positioned in close proximity to said tips so as to absorb heat radiated by said molten glass passing through and issuing from at least one row of tips subsequent to said cross-section of said glass fibers changing from a noncircular to round shape.

3. The bushing recited in claim 1 wherein each tip is tapered and has side walls of decreasing thickness in the direction of glass flow therethrough.

4. A method of forming a round glass fiber comprising:

heating glass to a temperature at which it has a viscosity of 500 poise or less;

drawing said glass through a plurality of glass fiber-forming tips having a noncircular opening at a glass discharge end which is substantially a regular polygon in shape;

allowing said glass to retain said viscosity for sufficient period of time such that surface tension forces in said drawn glass fibers change the cross-section of said fibers from an initial shape corresponding to said regular polygon shaped cross-section of said discharge end of said tip to a round shape; and cooling said fibers to maintain said round cross-sectional shape.

5. A bushing for the production of round glass fibers, comprising:

sidewalls;

a lower tip plate interconnecting lower edges of said sidewalls;

a plurality of discrete, spaced apart, hollow tips extending downwardly from said lower plate and aligned in adjacent rows to accommodate the flow of molten glass therethrough, each of said tips including four wall members forming a square cross-section at a lower discharge end of each of said tips; and means to allow said glass fibers to retain sufficiently low viscosity such that surface forces in said glass fibers can act on said fibers to change their cross-section from an initial, square shape corresponding to the square cross-section of said tip lower end to a round shape.

6. The bushing as in claim 1 wherein said tip cross-section at said lower end is substantially a regular polygon having between three and eight wall members.

7. The bushing as in claim 6 wherein each of said tips has four wall members forming a square section at said lower end of said tips, each tip further being oriented such that its diagonals lie substantially parallel to major and minor axes of said lower tip plate with said tips in adjacent rows being staggered with respect to one another so as to maximize the packing density of said tips upon said lower plate.

8. The bushing as in claim 1 wherein said cross-section remains constant throughout the length of said tip.

9. The bushing as in claim 5 wherein each of said tips are oriented such that their diagonals lie substantially parallel to major and minor axes of said lower plate with said tips in adjacent rows being staggered with respect to one another so as to maximize the packing density of said tips on said lower plate.

10. The method as in claim 4 wherein said heating step includes the step of heating said glass to a temperature in the range of approximately 2150° F. to 2400° F.

11. The method as in claim 4 where said allowing and cooling steps include the step of positioning fin coolers relative to said tips such that said glass retains sufficient heat form said round cross-section.

12. The method as in claim 4 wherein said allowing step includes the step of increasing the rate at which glass is drawn from said tips.

* * * * *

UNITED STATES PATENT AND TRADEMARK OFFICE
CERTIFICATE OF CORRECTION

PATENT NO. : 5,062,876
DATED : November 5, 1991
INVENTOR(S) : Thomas H. Jensen

It is certified that error appears in the above-indentified patent and that said Letters Patent is hereby corrected as shown below:

Claim 5, column 10, line 27, insert the word --a-- after the word retain.

Claim 11, column 10, line 58, insert the word --to-- after the word heat.

Signed and Sealed this

Sixth Day of August, 1996

Attest:

BRUCE LEHMAN

Attesting Officer

Commissioner of Patents and Trademarks